United States Patent
Wang

(10) Patent No.: US 7,774,643 B2
(45) Date of Patent: Aug. 10, 2010

(54) METHOD AND APPARATUS FOR PREVENTING PERMANENT DATA LOSS DUE TO SINGLE FAILURE OF A FAULT TOLERANT ARRAY

(75) Inventor: Yuanru Frank Wang, Broomfield, CO (US)

(73) Assignee: Dot Hill Systems Corporation, Longmont, CO (US)

(*) Notice: Subject to any disclaimer, the term of this patent is extended or adjusted under 35 U.S.C. 154(b) by 602 days.

(21) Appl. No.: 11/326,799

(22) Filed: Jan. 6, 2006

(65) Prior Publication Data

US 2007/0159897 A1    Jul. 12, 2007

(51) Int. Cl.
    G06F 12/16    (2006.01)
(52) U.S. Cl. .................. 714/8; 714/5; 714/6; 714/7
(58) Field of Classification Search .............. 714/6, 714/7, 8
    See application file for complete search history.

(56) References Cited

U.S. PATENT DOCUMENTS

| | | | |
|---|---|---|---|
| 5,313,626 A | | 5/1994 | Jones et al. |
| 5,619,723 A | | 4/1997 | Jones et al. |
| 5,715,221 A | * | 2/1998 | Ito et al. ................. 369/47.14 |
| 5,774,643 A | * | 6/1998 | Lubbers et al. ............... 714/20 |
| 5,826,001 A | * | 10/1998 | Lubbers et al. ................. 714/6 |
| 5,974,544 A | * | 10/1999 | Jeffries et al. .................. 713/1 |
| 6,161,192 A | * | 12/2000 | Lubbers et al. ................. 714/6 |
| 6,470,461 B1 | * | 10/2002 | Pinvidic et al. ................ 714/8 |
| 6,477,662 B1 | * | 11/2002 | Beffa et al. .................... 714/7 |
| 6,754,860 B2 | * | 6/2004 | Kim et al. .................... 714/723 |
| 2002/0069376 A1 | * | 6/2002 | Gregg et al. ................... 714/6 |
| 2002/0174295 A1 | * | 11/2002 | Ulrich et al. ................ 711/114 |
| 2003/0005353 A1 | * | 1/2003 | Mullins et al. ................. 714/5 |
| 2003/0204670 A1 | * | 10/2003 | Holt et al. ................... 711/112 |
| 2003/0225961 A1 | * | 12/2003 | Chow et al. ................. 711/103 |
| 2004/0225913 A1 | * | 11/2004 | Hori ............................. 714/6 |
| 2005/0022053 A1 | * | 1/2005 | Park et al. ..................... 714/7 |
| 2005/0114726 A1 | * | 5/2005 | Ouchi .......................... 714/5 |
| 2005/0144516 A1 | * | 6/2005 | Gonzalez et al. .............. 714/8 |
| 2005/0144517 A1 | * | 6/2005 | Zayas ........................... 714/8 |

* cited by examiner

Primary Examiner—Scott T Baderman
Assistant Examiner—Chae Ko
(74) Attorney, Agent, or Firm—Thomas J. Lavan; Bradley Knepper

(57) ABSTRACT

Methods and systems for preventing permanent data loss due to a single failure in an array of storage devices are described. In particular, a defective memory block is detected and data that was on the now defective memory block is reconstructed using backup data in the array. The reconstructed data is stored in a replacement memory block, without requiring the rewriting of data in non-defective memory blocks. The information mapping the defective memory block to the replacement memory block may be stored as metadata on a storage device.

21 Claims, 5 Drawing Sheets

METHOD AND APPARATUS FOR PREVENTING PERMANENT DATA LOSS DUE TO SINGLE FAILURE OF A FAULT TOLERANT ARRAY

FIELD

Methods and systems directed to preventing a permanent loss of data in an array of storage devices. In particular, methods and systems that prevent permanent data loss by reconstructing information from a defective memory block and maintaining the address of the reconstructed information in a secure location.

BACKGROUND

The need to store digital files, documents, pictures, images and other data continues to increase rapidly. In connection with the electronic storage of data, systems incorporating more than one storage device have been devised. In general, using a number of storage devices in a coordinated fashion in order to store data can increase the total storage volume of the system. In addition, data can be distributed across the multiple storage devices such that data will not be irretrievably lost if one of the storage devices (or in some cases more than one storage device) fails. An additional advantage that can be achieved by coordinating the operation of a number of individual storage devices is improved data access and/or storage times.

Storage systems that provide at least some integration of individual storage devices, such as JBOD (Just a Bunch of Disks), SBOD (Switched Bunch of Disks) or RAID (Redundant Array of Independent Disks) systems have been developed. These storage systems are typically deployed as a number of individual disk drives or other storage devices within an enclosure to present an integrated component to the user. In addition to the individual storage devices, the enclosure may contain one or more power supplies and one or more cooling devices. Integrated storage systems may also include one or more storage system controllers that can be used to control the distribution of data across the individual storage devices in a given storage system.

A RAID controller is a storage device that provides users with mass storage space, quick data access, and/or data protection. It can achieve data protection with either mirroring or parity data schemes. RAID level 1 provides a mirroring scheme, meaning every byte in one drive has a redundant copy in another drive. RAID levels 3, 4, and 5 provide parity protection. They allow a single drive failure without losing any customer data. These systems also offer to rebuild (reconstruct) the data from the failed drive to another drive if there is one such drive available. After a drive has failed and before the rebuild completes, the array is said to be in a critical condition, meaning another drive failure can cause the entire array to be unreadable. After the rebuild is complete, the array is said to be fault tolerant again, meaning that it believes it can sustain a drive failure without losing any customer data. Other RAID levels use redundant data storage such that a single drive failure does not lead to complete data loss. For example, some RAID levels may allow 2 or 3 failures before the array becomes critical. However, once the array becomes critical, the behavior is no different from the single parity protection arrays. Unfortunately, cases exist under these storage schemes where a single failure can still cause data to be lost, even in a fault tolerant array.

Disk drive vendors have attempted to minimize data losses resulting from bad areas on a disk by using a data reallocation technique. Typically, a certain number of sectors on a given drive are reserved for these reallocation purposes, and are "invisible" to the outside world. The disk drive sectors are accessed through a parameter called a Logical Block Address (LBA). The LBA defines where a particular sector can be found on a given disk. When a block of corrupted data or a bad block of data is found on a disk drive, the data that should have been stored in that block is recovered and written to another disk or another location on the same disk. There are several types of protocols that can be used to reconstruct data from a defective memory location. Two of these protocols are the Automatic Write Reallocation (AWRE) protocol and the Automatic Read Reallocation (ARRE) protocol.

When AWRE is enabled, a disk drive is allowed to automatically relocate bad data detected during write operations. For example, if a write command is issued to write data to a sector and there is a failure, the disk drive may map the data to be written to a new location. Typically, the data is written or rewritten to a new location that is not user accessible. Of course, the drive can only rewrite the data to a new location if the data used to reconstruct the data from the defective block is valid (e.g., the original data in the buffer is valid or the data is recovered from the backup media). The valid data is then written to a reserve location.

When ARRE is enabled, the disk drive is allowed to automatically relocate bad data detected during read operations. The reallocation of the data is performed in a similar fashion to the AWRE protocol. Namely, the defective stripe of data is reconstructed and written to a new location that is not user accessible. Again, the success of this reconstruction depends upon the backup data and whether or not it is valid.

The success of both reconstruction processes depends upon the information used to reconstruct the data from the defective location. The successful use of the reconstruction information further depends on mapping information. If the mapping information is lost, or backup memory locations are also defective, then data may be lost indefinitely. Unfortunately, most current systems store the mapping information in the controller memory. This memory is not fault tolerant even though the system believes it is fault tolerant. Furthermore, mapping information is typically stored on the buffers of the drive controller memory during reconstruction. In the event of a power outage, if no alternative power supplies are available, the mapping data may be lost and as a result the relocated data on the drive may be unrecoverable.

Another drawback with current reconstruction techniques is that they are not very economical in their redistribution data. For example, when a stripe of data containing a defective block is detected, the entire stripe of data is rewritten. Thus, an entire stripe of data needs to be reconstructed and allocated to a new stripe on the drive. It is inefficient to rewrite an entire stripe of data when only one block of that stripe of data may be defective. This process uses more reserve disk space than is necessary and a number of potentially good blocks of data are rewritten. The unnecessary rewriting of data also uses processing resources that otherwise could be used to perform other functions.

Another disadvantage in using current storage systems is that they do not maintain a record of their status with great accuracy. Currently, when a controller determines that a memory location is defective, the controller marks that location as bad and saves such information in the bad LBA map. If the number of bad LBAs reaches a particular threshold, the controller will treat that drive as a bad drive, and mark the array that the bad drive belongs to as critical. If a spare drive is available (e.g., a dedicated spare or a global spare), the controller will start a rebuild of the entire array on the backup drive.

Typically, it can take a long time for any particular drive to reach the threshold where it becomes marked as a bad drive. During this period of time, it is very likely other memory locations on the drives can become unreadable. In most redundant storage schemes, all of the disk drives that exist in the array are used to redundantly store a single stripe of data. If a majority of these memory locations become defective, then a data loss can occur without the drive actually reaching the bad LBA threshold. The odds of having the right combination of memory locations become defective, thus resulting in a permanent data loss, increases as the drive continues to be used. Since it typically takes a very long time for the number defective memory locations to reach the critical threshold, a permanent loss of data may occur even if the array is marked as fault tolerant.

SUMMARY

Methods and systems for protecting data on a storage device are provided. In accordance with embodiments of the present invention, a method of avoiding permanent data loss due to a defect in an information storage system includes: partitioning a first storage device into a first section that is used to store data and a second section that contains metadata, detecting a defective block on the first section of the first storage device, and reconstructing data that was stored at the defective block to a different block.

The data that was stored at the defective block is associated with a stripe of data having a number of blocks including at least one non-defective block and the non-defective block(s) is not reconstructed.

The method overcomes the deficiencies of the prior art by reconstructing only the defective block, rather than the entire stripe of data to which the block belonged. This enables the controller to use its processing power more efficiently. Namely, only data from a defective block is reconstructed, not both data from defective blocks and data from blocks that are error free. The method also results in quicker reconstruction times because only a block of data is being reconstructed, as opposed to a stripe of data.

A block may be considered defective, if data cannot be written to, read from, and/or verified properly at that block. Failure of the controller to perform any read, write, and/or verify command at a given block may indicate to the controller that the block is defective.

In accordance with embodiments of the present invention, a storage device is provided for use in an information storage system. In general, the storage device includes: a first section for storing data that is user accessible, a second section for storing metadata that is not user accessible, and a third section for storing metadata. The metadata stored on the third section provides an indication of a relationship between a first memory block in the first or second section and a second memory block.

Typically, the metadata stored on the third section comprises data that maps defective memory blocks to the replacement memory blocks. Since the mapping information is stored in metadata on the device, the mapping information cannot be lost during a power outage. Unlike the prior art where mapping data is stored in volatile memory, embodiments of the present invention maintain the mapping information in a non-volatile memory as metadata. This ensures that a replacement block for a bad block can be found, even if power is lost during operation and the volatile controller memory is erased.

In accordance with further embodiments of the present invention, an information storage system is provided. The system includes an array of at least two storage devices. One or both of the storage devices has a first section for storing data and a second section for storing metadata. The system further includes a controller in communication with the array of storage devices. At least one of the storage devices has a defective block and the controller, using data from backup data on the first and/or second storage device, reconstructs data that was stored on the defective block and stores it on an alternate block on the first and/or second disk. The data stored on the defective block is associated with a stripe of data having a number of blocks and at least one of those blocks is not defective and the non-defective block(s) is not reconstructed.

Additional features and advantages of the present invention will become more readily apparent from the following description, particularly when taken together with the accompanying drawings.

DETAILED DESCRIPTION

Figure 1:
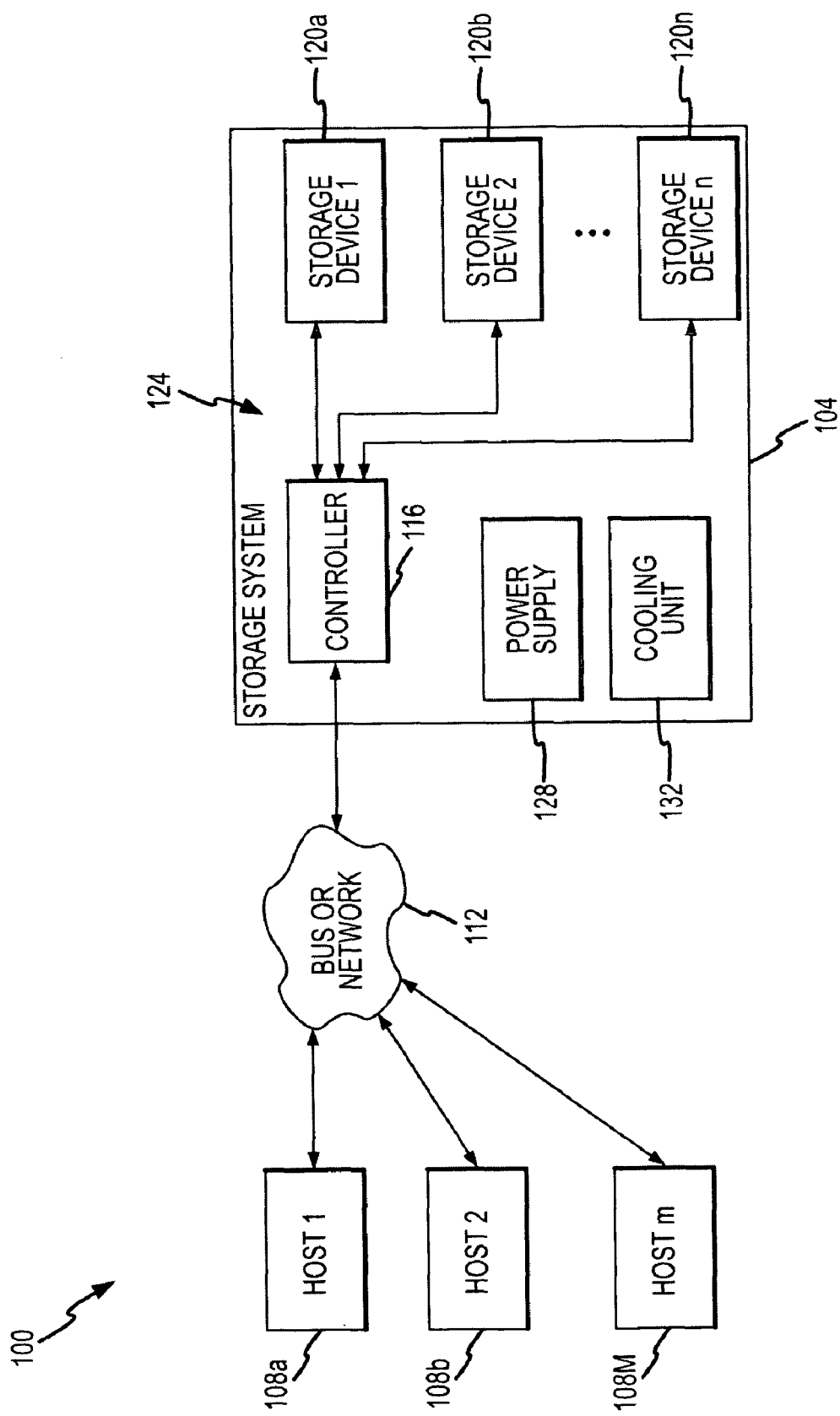
FIG. 1 is a block diagram of components of a storage system in accordance with embodiments of the present invention.

With reference to FIG. 1, a data system 100 associated with one or more storage systems 104 is illustrated. A storage system 104 generally comprises a means for data storage. The storage system 104 is generally interconnected to one or more host devices, processors or computers 108a-m, where m≧1, by a communication bus or network 112. The host devices 108a-m, are examples of devices that are capable of initiating commands. A host device 108 generally comprises a means for sending and/or receiving data. As can be appreciated by one of skill in the art, a host 108 can be a server or the like that, for example, provides access and read/write authorization to a user device. Also, the host 108 can be a user device for instance, a PC, a laptop, a PDA, and the like.

In accordance with embodiments of the present invention, a storage system 104 may comprise one or more storage system controllers 116 that can be interconnected to the hosts 108a-m via the network 112. The controller 116 generally comprises a means for controlling the storage system 104. The storage system 104 may also comprise one or more data storage devices 120a-n, where n≧1. Typically, the storage system controller 116 is connected to the storage devices 120*a-n* through a storage device communication link, bus, or network 124.

In general, a storage system controller 116 controls the storage and retrieval of data to or from the storage devices 120*a-n* included in the associated storage system 104. For example, the storage system controller 116 may perform read functions, write functions, data verification routines, parity checking, and error correction. A storage system controller 116 may also generally operate to receive and/or execute commands through one or more external user interfaces or ports in association with its storage system 104. In a typical storage system 104, one or two storage system controllers 116 may be included. The controller 116 may perform the above noted functions in response to a request by one of the hosts 108*a-m* or may perform background verification operations without receiving a request from a host 108.

As can be appreciated by one of skill in the art, providing multiple storage system controllers 116 is often desirable in order to provide redundancy, and to therefore provide improved fault tolerance and data availability. In addition, providing multiple (e.g. paired) storage system controllers 116 can improve data throughput. Storage system controllers 116 may also be provided as field replaceable units that are received by corresponding slots when installed in a storage system 104.

A storage system 104 may include a number of data storage devices 120*a-n*. If multiple data storage devices 120*a-n* are provided, they may be grouped in various coordinated ways, for example to provide redundancy, and/or to provide improved data throughput as compared to an uncoordinated grouping of data storage devices 120*a-n*. Possible configurations of the data storage devices 120*a-n* include a mirrored array, a parity array, and other configurations including various RAID configurations. Examples of different data storage devices 120 that may be included in a storage system 104 include hard disk drives, such as Fibre Channel (FC) hard disk drives. Other examples of data storage devices 120 that may be used in connection with embodiments of the present invention include serial advanced technology attachment (SATA) disk drives, small computer systems interface (SCSI) disk drives, and serial attached SCSI (SAS) drives. Embodiments of the present invention may also utilize data storage devices 120 other than devices utilizing magnetic disks as a storage medium. For example, a data storage device 120 may also include magnetic tape, optical storage devices or solid-state disk devices.

The storage system 104 may further include a power supply 128 and a cooling unit 132. The power supply 128 may be an AC to DC power converter that supplies the various components of the storage system 104 with the power they require to operate. The power supply 128 may also be a backup power supply in case the main power supply to the storage system 104 fails. The backup power supply will be engaged if the normal power supply is interrupted, thus data that is stored in power dependent memory will not be lost. The cooling unit 132 ensures that components of the storage system 104 do not become overheated. The cooling unit 132 may continuously run, or may be powered on/off intermittently.

The communication or storage area network 112 generally functions to transport data between storage systems 104 and host devices 108*a-m*, and can be any data pipe capable of supporting multiple initiators and targets. Accordingly, examples of communication networks 112 include Fibre Channel (FC), SCSI, internet SCSI (iSCSI), parallel SCSI, Ethernet, ESCON, FICON, Infiniband, and like connections or networks. The communication network 112 can also be used for the transfer of notifications of events, communications and/or commands between storage systems 104 and host devices 108*a-m*. Furthermore, the communication network 112 can comprise one or more interconnected networks of various types, utilizing various data processing and routing devices (not shown).

The storage device communication link or network 124 generally functions to support the transfer of data between storage system controller 116 and data storage devices 120*a-n*. Examples of a storage device communication network 124 include an FC, SCSI, iSCSI, parallel SCSI, or SAS connections or networks and the like.

Figure 2:
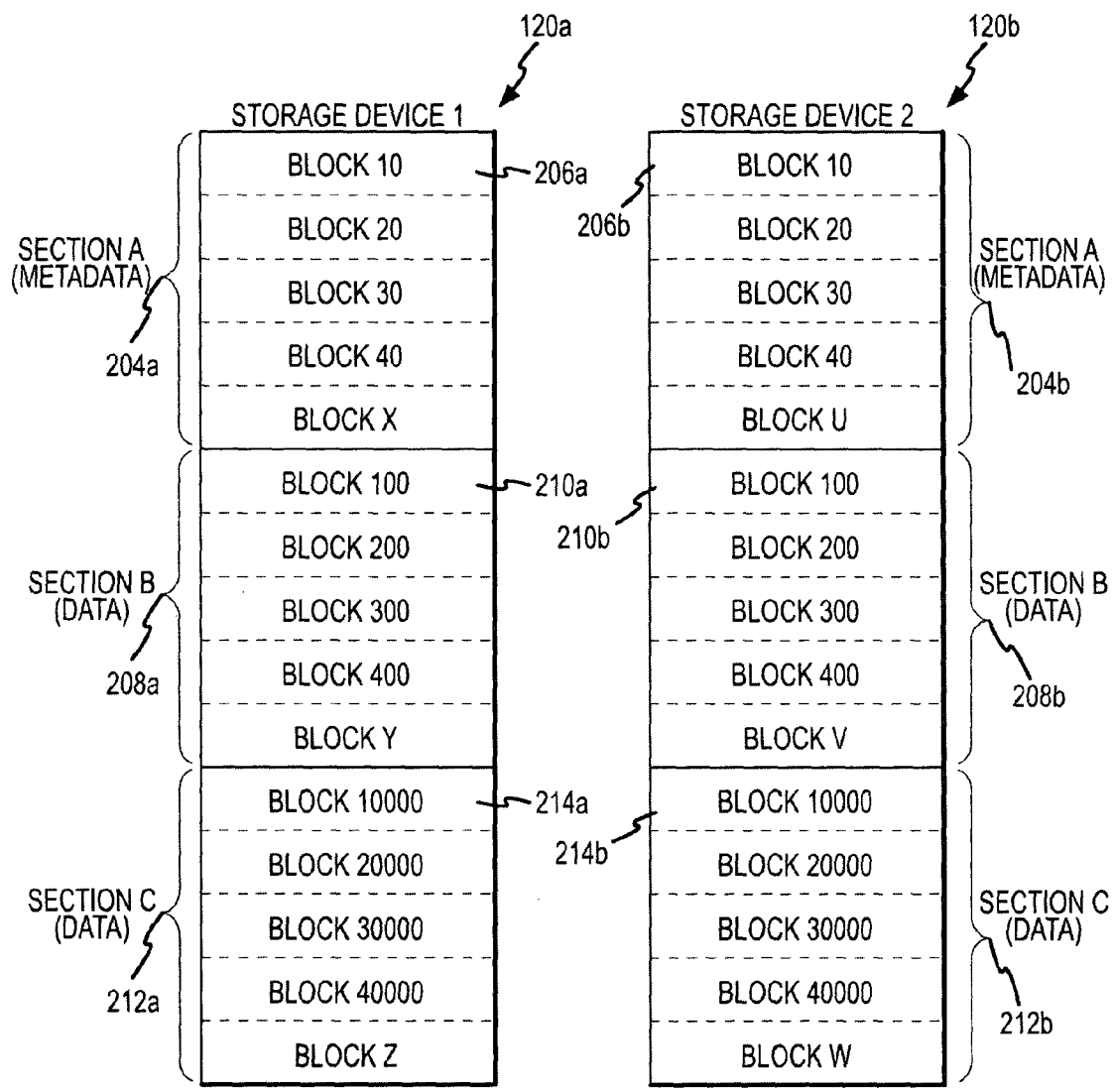
FIG. 2 is a block diagram depicting the allocation of storage space in a storage device in accordance with embodiments of the present invention.

With reference to FIG. 2, the allocation of storage space on one or more storage devices 120*a-n* will be discussed in accordance with embodiments of the present invention. A first storage device 120*a* is separated into three sections. The first section 204*a* contains up to X blocks 206 of memory, the second section 208*a* contains up to Y blocks 210 of memory, and the third section 212*a* contains up to Z blocks 214 of memory. The size of each block of memory may be set to any predetermined size, however block size is typically set to 512 bytes. The value of X, Y, and Z is typically greater than 1 and the sum of X, Y, and Z cannot be greater than the number of blocks available on the first storage device 120*a*.

A second storage device 120*b* may be partitioned in a similar fashion to that of the first storage device 120*a*. The second storage device 120*b* comprises a first section 204*b* containing up to U blocks 206 of memory, a second section 208*b* containing up to V blocks 210 of memory, and a third section 212*b* containing up to W blocks 214 of memory. The size of each block of memory may be set to any predetermined size and does not necessarily have to be the same in all sections. However, block size is typically set to 512 bytes. The value of U, V, and W is typically greater than 1 and the sum of U, V, and W cannot be greater than the number of blocks available on the second storage device 120*b*. More storage devices may be provided that are similar to those depicted or only have a subset of the sections described above.

The size of the third section 212 may be configurable such that is can be changed from a minimum size when less size is required, to a maximum size just before the device is declared bad. In other words, when there is no data in the third section 212, it does not need to have 100 blocks of memory allocated to it. The allocation of memory blocks in the third section 212 may occur as it becomes necessary. When there are no memory blocks left on a particular device, then the device may be marked as critical.

The first section 204 and third section 212 of a storage device 120 is typically reserved for the storage of metadata. The second section 208 of a storage device 120 are typically reserved for the storage of actual data. The second section 208 differs from the third section 212 in that the user access privileges are different for the second section 208 and the third section 212. User access is allowed in the second section 208, thus data is initially stored in a block 210 in the second section 208. A host 108 may directly access data in the second section 208 for use. Direct user access to the first section 204 and the third section 212 is generally not allowed. Rather, only the controller 116 is allowed access to data in this section.

Consider, for example, when data is written to an available block 210*a* (LBA=100) in the first storage device 120*a*, parity data is also written to an available block 210*b* (LBA=100) in the second storage device 120*b*. In the event that the amount of data to be written exceeds the size of a single block (e.g., the data size is greater than 512 bytes), then additional blocks

210 in either the first storage device 120a or a different storage device are allocated to accommodate the additional data that now constitutes a stripe of data with more than one block. Again, the parity data can be stored in an available block 210b in the second storage device 120b or in other available memory locations.

If one of the blocks containing the newly written data is determined to be defective by the controller 116, then data from the defective block is reconstructed from the backup data and written to an available memory block 214 in one of the storage devices 120. Generally, a defective block is detected during a read, write, or verify operation. For example, if the memory block LBA 100 in the first storage device 120a is determined to be defective, then the parity data from memory block LBA 100 in the second storage device 120b is used to reconstruct the data on the defective block. The reconstructed data can then be written to an available block 214a in the first storage device 120a (LBA=10000). The information mapping the defective block LBA 100 in the first storage device 120a to the alternate block LBA 10000 in the first storage device 120a is stored as metadata in an available memory block 206a in the first storage device 120a (LBA=10). The mapping data includes the address of the defective block (LBA 100), including which storage device 120 the defective resides block on (storage device 1), and the address of the replacement block (LBA 10000), including which storage device 120 the replacement block resides on (storage device 1). Whenever a host 108 issues a command to access data that was previously on the defective block, the controller 116 can find the location of the replacement data by consulting the mapping data that is stored as metadata on the storage device 120. The controller 116 then directly accesses the replacement data and performs the issued command using the replacement data.

The replacement data may also prove useful in the event that the memory block storing the parity data becomes defective. If the controller 116 determines that the parity memory block on the second storage device 120b is defective, it may locate the replacement data by consulting the mapping data on the first storage device 120a. Once the replacement data has been found, the parity data may be reconstructed and stored to an available block 214b in the second storage device 120b (LBA=10000). The information mapping the defective parity block LBA 100 in the second storage device 120b to the alternate block LBA 10000 in the second device 120b is stored as metadata in an available memory block 206b in the second device (LBA=10).

As can be appreciated, a replacement block does not necessarily need to reside on the same storage device as the defective block. For example, a defective memory block may reside on the first storage device 120a and the replacement block may reside on the second storage device 120b. This may be particularly useful if the fidelity of the first storage device 120a is brought into question due to an unusually high number of defective memory blocks discovered thereon. Additionally, the mapping information does not necessarily need to reside on the same storage device 120 as the defective block and/or the replacement block. If the replacement block resides on a different storage device 120 than the defective block, the mapping information may be kept on the storage device 120 associated with the defective block or the storage device 120 associated with the replacement. Furthermore, the mapping information may be stored on both storage devices 120 to provide redundancy. Still further, the mapping information may be stored on a storage device 120 completely separated from the defective and replacement blocks.

Realizing that the reserved replacement blocks may become defective, a nested link may be utilized. When an original memory block is found to be defective, the data from that block is reconstructed and stored in a reserve memory block. A mapping between the original memory block and the replacement memory block is created and stored as metadata. If it is later determined that the reserve memory block has become defective, the data from the first reserve memory block is reconstructed and stored in a second reserve memory block. Then mapping information is stored as metadata linking the first reserve memory block (now defective) to the second reserve memory block. This process may continue allowing the controller 116 to always have access to data from the original defective memory block through the nested link.

Figure 3:
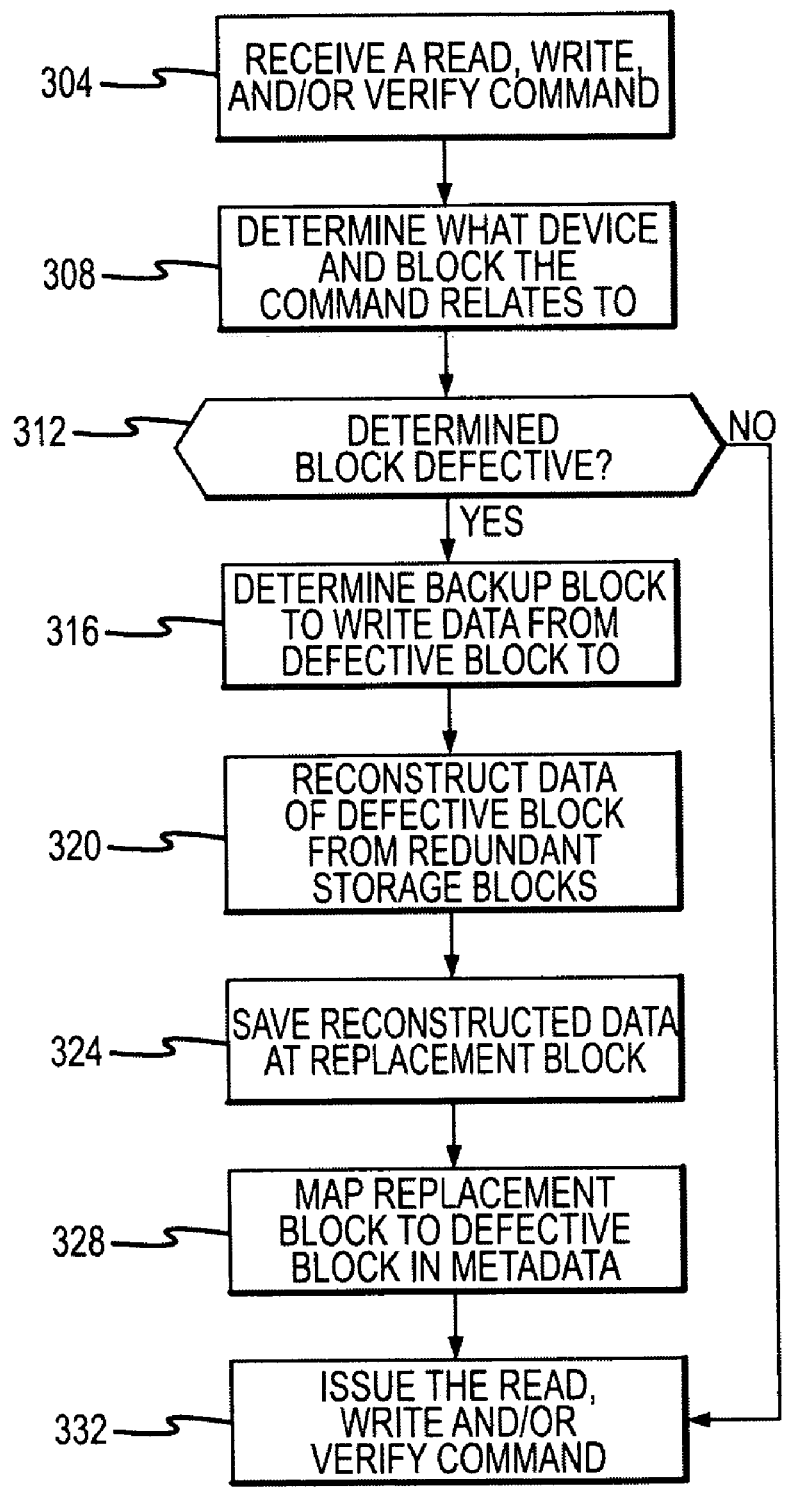
FIG. 3 is a flow chart depicting aspects of the operation of a storage system controller in accordance with embodiments of the present invention in connection with detecting and reconstructing defective blocks of data.

Referring now to FIG. 3, a process of reconstructing defective blocks in accordance with embodiments of the present invention is illustrated. Initially, a controller 116 receives a command from a host 108 (step 304). The command can be a read, write, and/or verify command. In the event of a read or verify command, the controller 116 analyzes the command and determines what data is required in order to complete the given command. Assuming that the required data is not in a cache of the controller 116, the controller 116 further determines the location of the data in the storage system 104 (step 308). If the stripe of data is smaller than the determined block size, then the location of the required data can be confined to a single memory block. However, if the stripe of data is larger than the determined block size, then the location of the required data will include a number of memory blocks. Storage device number and block address usually define the location of data.

In step 312, the controller 116 determines if the determined location is marked as defective. The controller 116 can do this by initially scanning all of the mapping metadata for the storage device 120 where the data should be located. The controller 116 may also attempt to access the data directly to determine if the associated block is defective. If the associated memory block is not defective, then the controller simply issues the command that it received utilizing the data from the functional memory block (step 332). However, if the controller 116 determines that the memory block associated with the required data is defective, the controller 116 determines an alternate location to store data that was previously stored on the now defective block (step 316).

Once the controller 116 has determined where it will store data from the defective block, it begins to reconstruct the data that was on the defective block using the backup data (e.g., a mirrored copy or a parity copy)(step 320). In step 324, the reconstructed data is stored at the replacement block. The controller 116 then constructs and stores information mapping the replacement block to the defective block as metadata in a storage device 120 (step 328). Once the mapping information has been stored, the controller 116 issues the command that it received (step 332).

As can be appreciated, the above-described process is suitable for use with data stored on more than one block. For example, if a host 108 issues a command that requires the controller 116 to access data that is stored on more than one memory block, the controller 116 can determine the addresses of all blocks belonging to the stripe of data. Then if the controller 116 determines that any particular block is defective, the controller 116 can reconstruct that block and save it to a replacement block. The controller 116 does not necessarily need to rewrite all of the good data from all other memory blocks, thus consuming valuable processing resources. Instead, the defective blocks are reconstructed and the data from the reconstruction is stored on replacement blocks. As a result, mapping information is only required for the defective blocks, instead of the entire data stripe.

Figure 4:
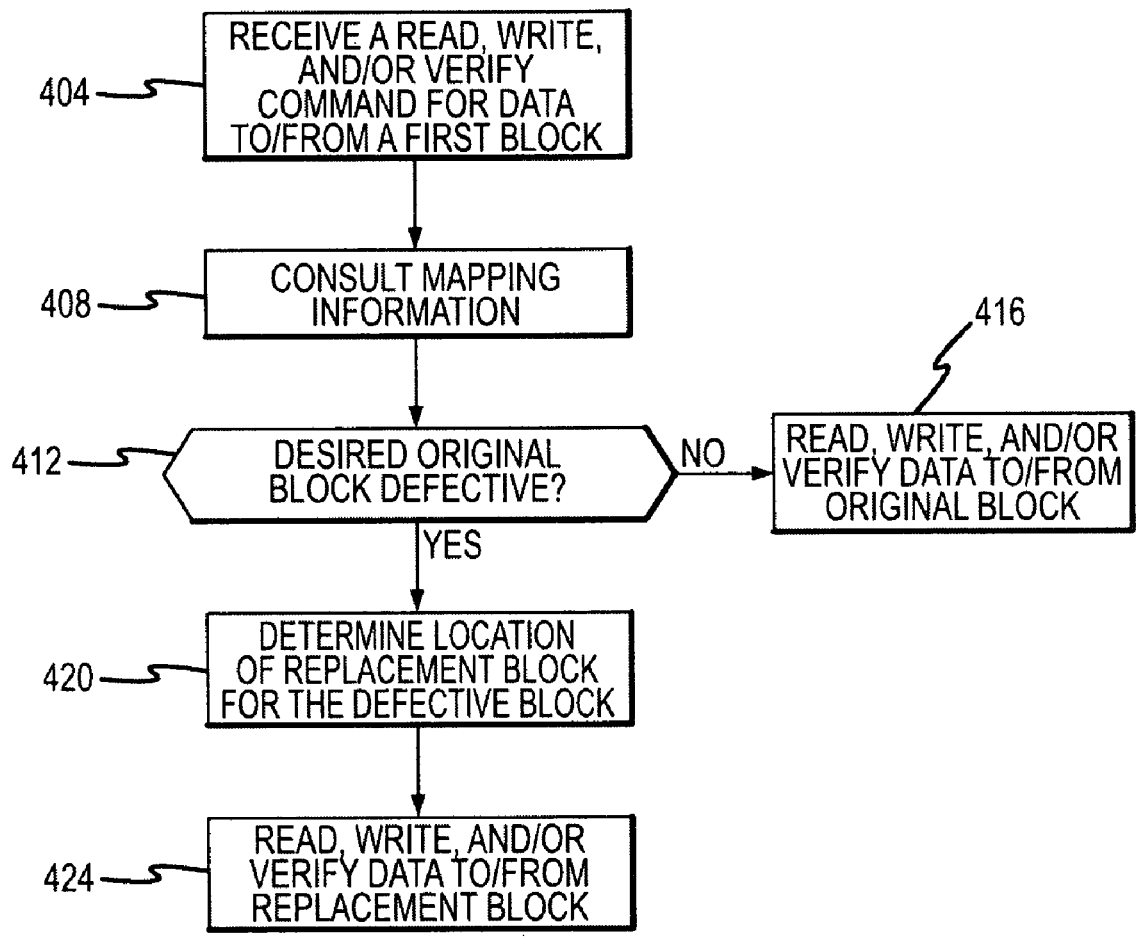
FIG. 4 is a flow chart depicting aspects of the operation of a storage system controller in accordance with embodiments of the present invention in connection with locating a replacement block for a defective block of data.

Referring now to FIG. 4, a process of utilizing mapping data in accordance with embodiments of the present invention is illustrated. The controller 116 receives a command from a host 108 (step 404). As noted above, the controller 116 determines what data is necessary to execute the given command. Once the controller 116 has processed the received command, the controller 116 consults the metadata containing information related to defective blocks (step 408). Initially, the controller 116 consults the mapping data in order to determine if the required data is stored on a previously marked defective memory block (step 412). If the required data is not stored on a defective memory block, then the controller issues the received command using data from the original block (step 416). However, if the controller 116 determines that the data was stored on a now defective block, the controller 116 uses the mapping data to determine the location where reconstructed data from the defective block was stored (step 420). In the event that the first replacement block is also marked as defective, the controller 116 continues to analyze the nested linking of replacement memory blocks to defective memory blocks until the location of a good replacement block is found. Once the memory block is found that contains the required data, the controller 116 issues the command utilizing data from the replacement block (step 424).

Figure 5:
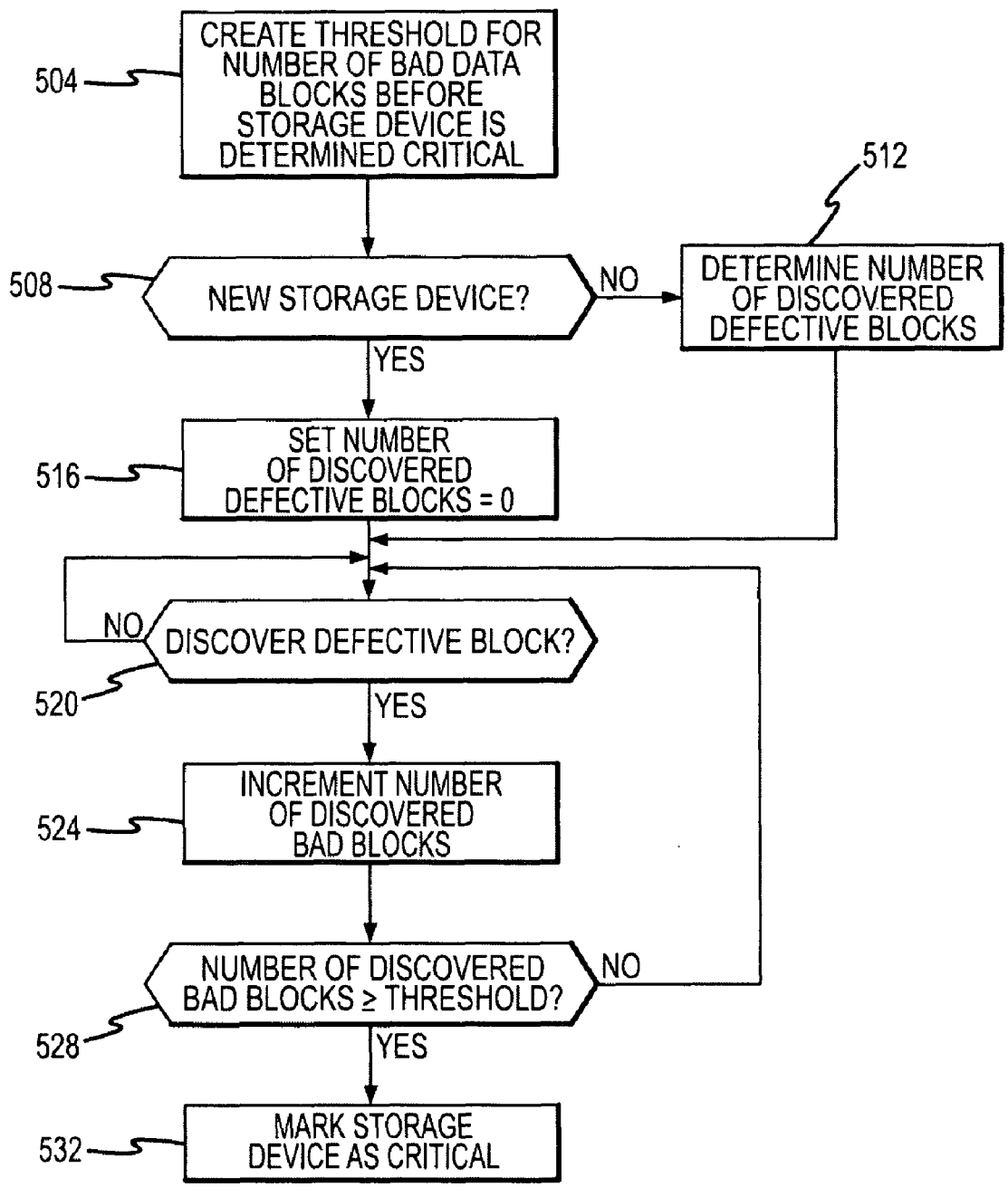
FIG. 5 is a flow chart depicting aspects of the operation of a storage system controller in accordance with embodiments of the present invention in connection with updating the status of a particular storage device.

With reference to FIG. 5, a process of updating the status of a storage device 120 in accordance with embodiments of the present invention is illustrated. Initially, a threshold for the number of defective data blocks is determined (step 504). The threshold is used to indicate whether a particular storage device 120 has too many defective memory blocks and should be labeled as critical. In step 508, it is determined if the subject storage device 120 is a new storage device. If the storage device 120 is not a new storage device, then the number of discovered defective blocks is determined for that storage device 120 (step 512). Additionally, a variable representing the number of defective blocks is set equal to the number of discovered defective blocks for the storage device 120. If the storage device 120 is new and has no discovered defective blocks, then the variable representing the number of defective memory blocks is set equal to zero (step 516). Essentially each storage device 120 has an associated variable that keeps track of the number of defective blocks that have been discovered on the storage device 120. The controller 116 will continue to process requests as usual until a defective block is discovered in step 520. Once a defective block has been discovered, the variable representing the number of defective blocks for that particular storage device 120 is incremented to reflect the newly discovered defective block (step 524). In step 528, it is determined if the number of defective blocks for that storage device 120 is greater than or equal to the previously determined threshold. If the threshold is met or exceeded, then the controller 116 marks that particular storage device 120 as critical and notifies either a host 108 or an operator of the system 100 (step 532). If the threshold has not been met or exceeded, then the controller 116 continues to process commands until another defective block is discovered in step 520. By only replacing defective blocks, the controller 116 is operable to determine if a particular storage device 120 is in a critical state with greater precision than afforded by the prior art.

As can be appreciated by one of skill in the art, an advantage offered by embodiments of the present invention include the fact that implementing this data loss prevention scheme does not impact the normal operational performance of the system. Specifically, if a block is determined to be defective, then steps are taken in accordance with embodiments of the present invention. However, if the data that is required to perform a particular task resides on a good memory block, then additional steps typically do not need to be performed. In other words, the only time the controller 116 performs the data managements steps noted above is when there is a failure in the system.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described herein above are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method of avoiding permanent data loss due to a defect in an information storage system, comprising:
    designating a first storage device to store data and not metadata, and a second storage device to store metadata;
    determining if the first storage device is a new storage device;
        if the first storage device is not a new storage device, determining a number of defective blocks in the first storage device and setting an index to the number of defective blocks in the first storage device; and
        if the first storage device is a new storage device, foregoing determining the number of defective blocks in the first storage device and setting the index to zero;
    detecting a defective block on the first storage device;
    incrementing the index upon detection of the defective block, wherein the index corresponds to a number of defective blocks identified on the first storage device, wherein the first storage device is identified as critical if the index reaches a predetermined value;
    in response to detecting the defective block, reconstructing data that was stored at the defective block to a different block on the first storage device, wherein reconstructing data comprises recreating the data originally stored in the defective block without using data from the defective block; and
    mapping the defective block to the different block with mapping metadata and storing the mapping metadata in the second storage device, wherein the mapping metadata identifies the defective block, the different block and the logical connection between the defective block and different block, wherein the data that was stored at the defective block is associated with a stripe of data comprising a number of blocks including at least one non-defective block and wherein the at least one non-defective block is not reconstructed.

2. The method of claim 1, wherein the first storage device is further portioned into a first part that is user accessible and a second part that is only available for controller access.

3. The method of claim 2, wherein the defective block is on the first part of the first storage device and the different block is on the second part of the first storage device.

4. The method of claim 1, wherein the different block is on a third storage device.

5. The method of claim 1, wherein the defective block was initially detected in response a read command issued by a controller of the first storage device.

6. The method of claim 1, further comprising storing the mapping metadata on the second storage device about the relationship between the defective block and the different block.

7. The method of claim 6, further comprising:
in response to receiving at least one of a read, write, and verify command for the defective block, consulting the mapping metadata on the second storage device to determine the location of the reconstructed data; and
performing the at least one of a read, write and verify command utilizing the reconstructed data from the different block.

8. The method of claim 6, further comprising:
determining that the different block is defective;
in response to determining that the different block is defective, reconstructing data that was stored at the different block to a second different block; and
updating the mapping metadata to identify the defective block, the different block, the second different block, and the logical connection between the defective block, the different block, the second different block, wherein the mapping metadata comprises a nested link between the defective block, the different block, and the second different block.

9. An information storage system, comprising:
a first section of a first storage device for storing data that is user accessible, wherein the first section does not store metadata, wherein if the first storage device is not a new storage device, an index is set to a number of defective memory blocks in the first section of the first storage device, wherein if the first storage device is a new storage device, forego setting the index to the number of defective memory blocks in the first section of the first storage device and set the index to zero, wherein the first storage device is identified as critical if the index is at or above a predetermined value;
a second section of the first storage device for storing data that is not user accessible, wherein the second section does not store metadata; and
a second storage device for storing metadata, wherein metadata stored on the second storage device is a nested link which provides an indication of a relationship between a first memory block in at least one of the first and second sections, a second memory block, and a third memory block, wherein a maximum size of the metadata in the second storage device is configured such that when the second storage device is at capacity the second storage device is identified as critical, wherein the first and second memory blocks are defective memory blocks and the third memory block is a memory block where reconstructed data from the first memory block is stored, wherein reconstructed data comprises data originally stored in the defective block recreated without using data from the defective block.

10. The information storage system of claim 9, wherein the metadata stored on the second storage device is created in response to determining that the first memory block is defective and the data from the first memory block was reconstructed and stored at the second memory block.

11. The information storage system of claim 9, wherein the nested link provides an indication of a relationship between the first memory block and the second memory block as well as an indication of a relationship between the second memory block and the third memory block.

12. The information storage system of claim 9, wherein the first memory block resides in the first section and the second memory block resides in the second section.

13. The information storage system of claim 9, wherein the third memory block resides on a third storage device.

14. The information storage system of claim 9, wherein the first memory block and the third memory block reside on the second section.

15. The information storage system of claim 9, wherein the first memory block and the third memory block reside on the first section.

16. The information storage system of claim 9, wherein the first and second storage devices are at least one of a disk drive, tape drive, and optical storage device.

17. An information storage system, comprising:
an array of storage means comprising at least a first and second storage means, wherein the first storage means stores data and the second storage means stores metadata, wherein the first storage means does not store metadata; and
a means for controlling the array of storage means, wherein the means for controlling the array of storage means determines if the first storage means is a new storage means, wherein if the first storage means is not a new storage means the means for controlling the array of storage means sets an index to a number of defective memory blocks in the first storage means, wherein if the first storage means is a new storage means the means for controlling the array of storage means foregoes setting the index to the number of defective memory blocks in the first storage means and sets the index to zero, wherein the first storage means is identified as critical if the index is at or above a predetermined value;
wherein the first storage means has a defective block, wherein data stored on the defective block is originally reconstructed by the means for controlling the array of storage means from backup data on storage means other than the second storage means and stored on first alternate block on storage means other than the second storage means, wherein reconstructed data comprises recreating the data originally stored in the defective block without using data from the defective block, wherein the first alternate block is later identified as defective and data originally stored on the defective block is reconstructed on a second alternate block on storage means other than the second storage means, wherein mapping information identifying a relationship between the defective block, the first alternate block, and the third alternate block is stored on the second storage means in connection with the defective block, wherein the data stored on the defective block is associated with a stripe of data comprising a number of blocks including at least one non-defective block, wherein the at least one non-defective block is not reconstructed, and wherein at least one of the first and second alternate blocks and the defective block resides on a different storage means.

18. The system of claim 17, wherein the mapping information relating to the defective block and the first alternate block is stored on the second storage means.

19. The system of claim 18, wherein the mapping information relating to the first alternate block and the second alternate block is stored on the second storage means.

20. The system of claim 18, wherein the mapping information relating to the first alternate block and the second alternate block is stored on the second storage means.

21. The system of claim 18, wherein the array of storage means is at least one of a mirrored array and a parity array.

* * * * *